3,829,499
Patented Aug. 13, 1974

3,829,499
PRODUCTION OF DIETHYL KETONE
Kenzie Nozaki, El Cerrito, Calif., assignor to Shell Oil Company, New York, N.Y.
No Drawing. Filed Dec. 17, 1969, Ser. No. 885,997
Int. Cl. C07c 45/02
U.S. Cl. 260—597 A                     12 Claims

ABSTRACT OF THE DISCLOSURE

Production of diethyl ketone at high selectivity and rate by the reaction of ethylene, carbon monoxide and hydrogen under mild conditions of temperature and pressure in the presence of a temperature-stable cobalt carbonyl-nitrile catalyst system, optionally containing ammonia or a primary or tertiary amine as catalyst promoter.

BACKGROUND OF THE INVENTION

Roelen, in U.S. 2,327,066, issued Aug. 17, 1943, discloses that the reaction between ethylene, carbon monoxide and hydrogen in the presence of a cobalt-thorium-kieselguhr catalyst produces diethyl ketone as a by-product in minor amount. Gresham et al., U.S. 2,473,995, issued June 21, 1949, disclose that, in the reaction between ethylene, carbon monoxide, and hydrogen in the presence of cobalt carbonyl, diethyl ketone is obtained in improved yield when the reaction is carried out at pressures in excess of 300 atmospheres and with reactant ratios of particular ranges. Commercial feasibility of a process for production of diethyl ketone would be enhanced markedly by a process producing predominately diethyl ketone when operating at pressures substantially lower than 300 atmospheres and requiring comparatively low temperatures and by a catalyst system stable enough for reuse in recycle or continuous processing.

SUMMARY OF THE INVENTION

It has now been found that diethyl ketone is produced in high selectivity and rate from the reaction of ethylene, carbon monoxide and hydrogen at a temperature of from about 50° C. to about 150° C. and a pressure of about 50 to 2000 p.s.i.g. in the presence of a temperature-stable cobalt carbonyl-nitrile catalyst system. The process is additionally characterized by the optional use of ammonia or primary or tertiary amines in catalytic amount to increase the initial rate of reaction and to increase the selectivity.

DESCRIPTION OF PREFERRED EMBODIMENTS

The cobalt carbonyl-nitrile catalyst system required for the process of the invention can be prepared by a diversity of methods. A convenient method is to combine a cobalt salt, organic or inorganic, with a relatively volatile hydrocarbon solvent, for example, in liquid phase followed by reduction and carbonylation. Suitable cobalt salts comprise, for example, cobalt carboxylates such as octanoates, and the like, as well as cobalt salts of mineral acids such as chlorides, fluorides, sulfates, sulfonates, and the like. Operable also are mixtures of these cobalt salts. It is preferred, however, that when mixtures are used, at least one component of the mixture be cobalt alkanoate of 6 to 12 carbon atoms. The valence state of the cobalt may be reduced and the cobalt carbonyl formed by heating the solution in an atmosphere of hydrogen and carbon monoxide. The nitrile component may then be added and the hydrocarbon distilled off. Alternatively, the catalyst system can be prepared directly from crystalline dicobalt octacarbonyl by simple admixture with the nitrile.

The nitriles suitable for use in the process of the invention are mono- to di-nitriles of from 2 to 10 carbon atoms, preferably 2 to 7, containing only aromatic unsaturation, and containing nitrogen only in the nitrile functional group, i.e., in the —C≡N group. The nitrile functional group, i.e., the cyano group, is attached to a moiety which is saturated aliphatic, including cycloaliphatic, or is aromatic in character, preferably mononuclear aromatic. The moiety to which the nitrile functional group is attached is hydrocarbyl, that is, contains only atoms of carbon and hydrogen, or a substituted hydrocarbyl containing, besides atoms of carbon and hydrogen, other atoms such as oxygen, sulfur and halogen, particularly oxygen atoms present in functional groups such as alkoxy, aryloxy, and alkanoyloxy. Such preferred non-hydrocarbyl substituents are alkoxy and alkanoyloxy wherein the alkyl or alkanoyl is one of from 1 to 4 carbon atoms. Illustrative of suitable nitriles are acetonitrile, propionitrile, butyronitrile, valeronitrile, octanonitrile, decanonitrile, phenylacetonitrile, cyclohexanecarbonitrile, benzonitrile, 2-toluenecarbonitrile, methoxyacetonitrile, 3-methoxypropionitrile, α-acetoxybutyronitrile, furonitrile, oxalonitrile, succinonitrile, adiponitrile, 1,4 - cyclohexanedicarbonitrile, o-phthalonitrile, sebaconitrile, and the like. In general, nitriles which are mononitriles wherein the cyano group is attached to a hydrocarbyl moiety of 1 to 6 carbon atoms are preferred. Especially preferred are valeronitrile and benzonitrile.

The process of the invention is characterized by the requirement for only catalytic quantities of cobalt and the nitrile component. The ratio of catalyst to the ethylene reactant is generally not critical and may vary widely within the scope of the invention. Although utilization of larger amounts of cobalt carbonyl containing catalyst is not detrimental to the process of the invention, amounts larger than about 50 mole percent (calculated as cobalt metal) based on the reactant ethylene are not generally required. Amounts of cobalt less than about 0.1 mole percent on the same basis are generally unsuitable because of the inevitable physical losses of the catalyst during reaction and processing and the low rate of reaction. In most instances, amounts of catalysts from about 1 mole percent to about 10 mole percent based on ethylene are satisfactory and are preferred. The quantity of nitrile required is related to the amount of cobalt present, as described hereinafter. As little as about 0.5 mole of nitrile per gram atom of cobalt is required and at least about 1 mole is preferred. Most preferably, at least 2 moles of nitrile per gram atom of cobalt is satisfactory and conveniently used. There is no upper limit on the amount of nitrile required for any amount beyond that utilized as catalyst functions as solvent for the process. When functioning as solvent, nitrile is optionally employed in molar excess over the amount of reactant ethylene, and in general, moles of nitrile solvent up to about 150 moles per mole of ethylene reactant are satisfactory.

A particular advantage to the process of the invention resides in the high selectivities to diethyl ketone product and high rates of reaction achieved with the catalyst system. Thus, it is possible to obtain practical rates of reaction at lower temperatures. Temperatures employed will generally range between about 50° and about 150° C. and preferably between about 60° and about 125° C. Advantages of operating at lower temperatures include lower carbon monoxide pressures and decreased corrosion. Consequently, initial partial pressures of carbon monoxide in the range of from about 5 to about 2000 p.s.i.g., and particularly in the range of from about 50 to about 500 p.s.i.g., are preferred. The hydrogen partial pressure is preferably always maintained lower than the carbon monoxide partial pressure for catalyst stability to be maintained. Thus, the molar ratio of carbon monoxide to hydrogen is preferably always greater than one. The hydrogen partial pressure may vary from about 0.1 atmosphere to about 500 p.s.i.g. The hydrogen may be added all initially or preferably incrementally and it is preferably added in admixture with carbon monoxide. The ethylene reactant pressure may be from about 5 p.s.i.g. to about 2000 p.s.i.g. In general, the ethylene pressure should be at least double the hydrogen pressure; the molar ratio of ethylene to hydrogen is preferably always at least two, that is, two or greater. The total pressure of the system may vary from about 10 p.s.i.g. up to about 2500 p.s.i.g. and even higher. The unique stability of the catalyst of the present invention at the lower pressures makes the use of pressures of about 2000 p.s.i.g. and below particularly preferred. It is preferred that the total pressure of the system vary from about 50 p.s.i.g. to about 2000 p.s.i.g.

Subsequent to reaction, the reaction mixture is separated and the desired diethyl ketone product recovered by conventional means such as selective extraction, fractional distillation and chromatographic techniques. In a preferred mode of operation the reaction mixture is passed from the reactor to a separator from whence is distilled the light gases and the diethyl ketone product at about atmospheric pressure, leaving the cobalt carbonyl-nitrile catalyst system as bottoms to be recirculated back to the reactor. The excellent thermal stability of the cobalt carbonyl-nitrile catalyst system makes possible this practical and simple separation and recycle scheme.

During the process it has been observed that there is a relatively short induction period, e.g., usually less than 1 hour, during which the rate of reaction is slow and the selectivity to the diethyl ketone product is less than desired. It has been found that unexpectedly the addition of a specific amount of certain amines to the catalyst system obviates this induction period, promoting the rate of reaction and promoting the selectivity to diethyl ketone in the early, and even in the later, stages of the process. The amount of amine promoter is singularly critical. The amount required is from about 0.3 to about 1.5 moles of amine per gram atom of cobalt present in the catalyst. Preferably, the amount of amine used is from 0.5 to about 1.0 mole of amine per gram atom of cobalt. At greater amounts, for example, at about 2.0 moles of amine per gram atom of cobalt the effect is not only reversed, that is, not only in the induction period not overcome, but also the rate of reaction is reduced to a negligible value. Surprisingly, the amines that are effective for the hereinabove described purpose are ammonia and primary and tertiary amines. Suitable primary and tertiary amines are mono- to di-amines containing only aromatic unsaturation. The amines are suitably hydrocarbyl amines having only atoms of carbon or hydrogen besides the amino nitrogen atom(s) or are substituted-hydrocarbyl amines containing atoms of oxygen and halogen, particularly up to 2 atoms of halogen of atomic number from 18 to 35 inclusive, i.e., chlorine or bromine, which atoms are incorporated within functional groups such as ester and halo groups. Representative of the primary amines useful in the process includes methylamine, ethylamine, propylamine, n-butylamine, n-hexylamine, aniline, benzylamine, o-tolylamine, octylamine, nonylamine, decylamine, dodecylamine, 1-naphthylamine, 2-naphthylamine, and the like. Representative of the tertiary amines useful in the process includes trimethylamine, ethyldimethylamine, diethylmethylamine, pyridine, 3,4-lutidine, β-collidine, quinoline, pyrazine, 3-chloropyridine, 3,5-dichloropyridine, methyl nicotinate, and the like. By the term amine promoter is meant to include ammonia and also ammonium compounds which generate ammonia under the conditions at which the process is operated, such as ammonium carbamate and the like. Preferred are ammonia and primary or tertiary hydrocarbyl monoamines, said hydrocarbyl containing only aromatic unsaturation. Particularly preferred are primary or tertiary hydrocarbyl amines of up to 12 carbon atoms, especially benzylamine and pyridine.

The rate of reaction and selectivity to diethyl ketone in the presence of the cobalt carbonyl nitrile catalyst system also may be improved by a suitable pretreatment step. One type of pretreatment which is effective consists essentially of operating the process for a short period of time, e.g., at least about 0.5 hours, at a temperature of about 50 to about 75° C. higher than the normal process operating temperature. Another type of pretreatment includes heating at about 125° C. to about 175° C. the cobalt carbonyl-nitrile catalyst system with a carbon monoxide-hydrogen mixture of mole ratio of $CO/H_2$ in the range of about 1:1 to about 100:1 for a short period of about 0.1 to about 5 hours at a pressure of about 200 to about 2000 p.s.i.g. before initiating the process.

Example I

To a 600-ml. tantalum-lined reactor were added 2 grams of cobalt carbonyl (in the form of dicobalt octacarbonyl) and 10 grams of benzonitrile. Then 200 p.s.i.g. of ethylene and 250 p.s.i.g. of carbon monoxide were added to the reactor and the vessel was heated to 100° C. with agitation. Five 20-p.s.i.g. increments of a 1:1 mixture of $H_2$ and CO were added at 1 hour intervals over a 5-hour period while the temperature was maintained at 100° C. The total incremental pressure drop was 200 p.s.i.g., the theoretical value. The reaction mixture was then conducted to a separator from which were distilled the product components. Analysis indicated that conversion was 90%, based on hydrogen, with a selectivity of 95% to diethyl ketone and 5% to propionaldehyde. Remaining as bottoms from the product distillation was cobalt carbonyl-benzonitrile mixture, which was recirculated back to the reactor for further use. After cooling to room temperature, adding additional ethylene, carbon monoxide and hydrogen, and reacting at 100° C., the rate of reaction and selectivity to diethyl ketone with the recirculated catalyst were as good as for fresh unheated material.

Repetition of the above procedure using cobalt carbonyl-valeronitrile or cobalt carbonyl-acetonitrile in place of cobalt carbonyl-benzonitrile gives similar results.

Example II

To a 50-ml. stainless steel vessel were added 0.26 grams of dicobalt octacarbonyl, 1 gram of benzonitrile, 200 p.s.i.g. of ethylene, 250 p.s.ig. of carbon monoxide and 50 p.s.i.g. of hydrogen. The vessel was heated at 100° C. for four hours with agitation Analysis of the product indicated a 60% conversion based on hydrogen charged with a selectivity of 94% to diethyl ketone and of 6% to propionaldehyde.

For purposes of comparison, the above experiment was repeated with 1 gram of n-octane substituted for the benzonitrile. A conversion of 45% was obtained with a selectivity of 43% to diethyl ketone, of 41% to propionaldehyde and of 16% to aldol condensation products.

Example III

To a 600-ml. tantalum-lined reactor were added 2 grams of dicobalt octacarbonyl and 10 grams of benzonitrile. Ethylene, 150 p.s.i.g., and carbon monoxide, 250 p.s.i.g., were added to the reactor and the vessel was heated to 100° C. with agitation. Three 10-p.s.i.g. increments of hydrogen were added at one hour intervals with a total reaction time of 4 hours at 100° C. Pressure drop data indicated that an induction period occurred. Analysis of the product indicated a conversion of 55% based on hydrogen charged with a selectivity of 93% to diethyl ketone and of 7% to propionaldehyde.

The above experiment was repeated except that the dicobalt octacarbonylbenzonitrile mixture was treated for 0.5 hours at 150° C. with a mixture of 35 p.s.i.g. of hydrogen and 800 p.s.i.g. of carbon monoxide before using in the above reaction with ethylene. Pressure drop data indicated the absence of an induction period and a conversion of 93% with a 99% selectivity to diethyl ketone.

Example IV

To demonstrate the effect of amine promoters, listed in Table I below, particularly on the induction period, a series of experiments was conducted for a period of 50 minutes. The conditions and results therefrom are tabulated in Table I.

TABLE I

Conditions.—50-ml. Reactor, 50 min., 100° C., 0.23 g. $Co_2(CO)_8$, 1 g. $C_6H_5CN$, 200 p.s.i.g. $C_2H_4$, 250 p.s.i.g. CO, 50 p.s.i.g. $H_2$

| Amine promoter | Wt., g. | Conv., percent | $(C_2H_5)_2CO$ | $C_2H_5CHO$ | Other |
|---|---|---|---|---|---|
| None | | 21 | 70 | 30 | |
| Benzylamine | 0.15 | 79 | 96.5 | 2.5 | 1 |
| n-Butylamine | 0.10 | 74 | 95.0 | 2.0 | 3 |
| Aniline | 0.13 | 68 | 97.5 | 2.5 | |
| n-Hexylamine | 0.14 | 64 | 90 | 6.6 | 3.4 |
| Diethylmethylamine | 0.12 | 90 | 91 | 8 | 1 |
| Pyridine | 0.12 | 60 | 96 | 4 | |
| 3,4-lutidine | 0.15 | 30 | 95.5 | 4.5 | |
| 3-chloropyridine | 0.16 | 45 | 96.5 | 3.5 | |
| Methyl nicotinate | 0.17 | 48 | 95 | 5 | |
| Pyrazine | 0.11 | 58 | 98 | 2 | |
| Trimethylamine | 0.10 | 90 | 95 | 5 | |
| 2-naphthylamine | 0.20 | 65 | 97 | 3 | |
| Ammonia | 0.03 | 72 | 90 | 6 | 4 |
| Ammonium carbamate | 0.06 | 37 | 98 | 2 | |

Under these conditions of 50-min. operation the values for selectivity to diethyl ketone are more significant than the values for conversion of ethylene since the cobalt carbonyl-nitrile system is highly active even without promoters.

Example V

Following the method of Example II varying molar amounts of benzylamine per gram atom of cobalt were added to the system. The conditions and results therefrom are tabulated in Table II.

TABLE II

Conditions.—600-ml. Ta Reactor, 2.0-2.5 g. $CO_2(CO)_8$, 10 g. $C_6H_5CN$

| Moles benzyl-amine/gram atom cobalt | Time, hr. | Temp., °C. | $C_2H_4$, p.s.i.g. | CO, p.s.i.g. | $H_2$, p.s.i.g. | Conv., percent | $(C_2H_5)_2CO$ | $C_2H_5CHO$ | Other |
|---|---|---|---|---|---|---|---|---|---|
| 0.5 | 2 | 100 | 200 | 250 | 50 | 95 | 99 | 1 | |
| 1.0 | 2 | 100 | 200 | 250 | 50 | 99 | >99 | | |
| 2.0 | 2 | 100 | 200 | 250 | 50 | 3 | | | |
| 1.0 | 4 | 80 | 200 | 250 | 50 | 89 | 98 | | 2 |
| 1.0 | 4 | 80 | 100 | 125 | 25 | 94 | >99 | | |
| 1.0 | 20 | 60 | 200 | 250 | 50 | 99 | 97 | 1 | 2 |

I claim as my invention:

1. The process of producing predominantly diethyl ketone by reacting ethylene, carbon monoxide and hydrogen in the presence of a catalytic amount of a cobalt carbonyl catalyst containing only cobalt and carbon monoxide and at least about 0.5 mole of a nitrile catalyst per gram atom of cobalt, the nitrile being a mono- to di-nitrile of 2 to 10 carbon atoms containing only aromatic unsaturation and nitrogen only in the form of the cyano grouping, at a temperature of from about 50° to about 150° C. and a pressure of about 50 to 2000 p.s.i.g., the molar ratio of ethylene to hydrogen being at least two and the ratio of carbon monoxide to hydrogen being greater than one.

2. The process of claim 1 wherein, subsequent to reaction, the reaction mixture is distilled, the diethyl ketone product is recovered therefrom and the residue of said distillation containing said cobalt carbonyl and said nitrile is recycled to the primary reaction zone as an active catalyst therefor.

3. The process of claim 1 wherein said temperature is from about 60° to about 125° C. and said cobalt carbonyl catalyst is prepared by reduction and carbonylation of a cobalt salt in liquid phase.

4. The process of claim 1 wherein the nitrile is a mononitrile in which the cyano group is attached to a hydrocarbyl moiety of 1 to 6 carbon atoms.

5. The process of claim 1 conducted in the additional presence of from about 0.3 to about 1.5 moles of an amine selected from the group consisting of ammonia and primary and tertiary hydrocarbyl amines containing up to 12 carbon atoms, said hydrocarbyl containing only aromatic unsaturation, per gram atom of cobalt present.

6. The process of claim 3 wherein, prior to reaction, said cobalt carbonyl catalyst and nitrile are heated at about 125° C. to about 175° C. in the presence of a mixture of carbon monoxide and hydrogen of mole ratio of CO to $H_2$ in the range of about 1:1 to about 100:1 at a pressure of about 200 to about 2000 p.s.i.g.

7. The process of claim 3 wherein the cobalt carbonyl catalyst is dicobalt octacarbonyl.

8. The process of claim 4 wherein the mononitrile is benzonitrile.

9. The process of claim 4 wherein the mononitrile is valeronitrile.

10. The process of claim 5 wherein said amine is ammonia.

11. The process of claim 5 wherein said amine is benzylamine.

12. The process of claim 5 wherein said amine is pyridine.

References Cited

UNITED STATES PATENTS

| 2,053,233 | 9/1936 | Woodhouse | 260—597 A |
| 2,327,066 | 8/1943 | Roelen | 260—597 A |
| 2,473,995 | 6/1949 | Gresham et al. | |
| 3,231,621 | 1/1966 | Slaugh | 260—604 HF |
| 3,257,459 | 6/1966 | Swakon et al. | 260—604 |
| 2,820,059 | 1/1958 | Hasek et al. | 260—604 |

FOREIGN PATENTS

| 500,802 | 3/1954 | Canada | 260—597 A |

BERNARD HELFIN, Primary Examiner

W. B. LONE, Assistant Examiner